United States Patent [19]

Schupback

[11] Patent Number: 5,015,008
[45] Date of Patent: May 14, 1991

[54] STABILIZER PAD ASSEMBLY FOR AN EARTH MOVING APPARATUS

[75] Inventor: Jesse L. Schupback, West Burlington, Iowa

[73] Assignee: J. I. Case Company, Racine, Wash.

[21] Appl. No.: 506,625

[22] Filed: Apr. 9, 1990

[51] Int. Cl.$^5$ ............................................... B60S 9/02
[52] U.S. Cl. ................................ 280/764.1; 212/189
[58] Field of Search ............... 280/763.1, 764.1, 765.1, 280/766.1; 212/189

[56] References Cited

U.S. PATENT DOCUMENTS

| | | | |
|---|---|---|---|
| 3,365,214 | 1/1968 | Garnett | 280/763.1 |
| 3,638,965 | 2/1972 | Cassady | 280/764.1 |
| 3,721,458 | 3/1973 | Mitchell | 280/764.1 |
| 3,897,079 | 7/1975 | MacKenzie et al. | 280/764.1 |
| 3,913,942 | 10/1975 | MacKenzie et al. | 280/764.1 |
| 3,924,876 | 12/1975 | Vaillant et al. | 280/764.1 |
| 3,930,668 | 1/1976 | Schuermann et al. | 280/763.1 |
| 3,990,714 | 11/1976 | Hornagold | 280/765.1 |
| 4,023,828 | 5/1977 | MacKenzie et al. | 280/763.1 |
| 4,039,206 | 8/1977 | Nault | 280/763.1 |
| 4,761,021 | 8/1988 | Lagsdin | 280/764.1 |
| 4,889,362 | 12/1989 | Lagsdin | 280/763.1 |

*Primary Examiner*—Andres Kashnikow
*Assistant Examiner*—Brian L. Johnson
*Attorney, Agent, or Firm*—Dressler, Goldsmith, Shore, Sutker & Milnamow, Ltd.

[57] ABSTRACT

A stabilizer pad assembly including a reversible stabilizer pad and a pad limit stop designed as an attachment to a positionable support arm of an earth moving apparatus such as a loader/backhoe. The pad limit stop is configured to wedge between the stabilizer pad and a distal end of the support arm in a manner limiting movement of the stabilizer pad between alternate positions and thereby inhibiting damage to a driver used to control the position of the support arm.

10 Claims, 3 Drawing Sheets

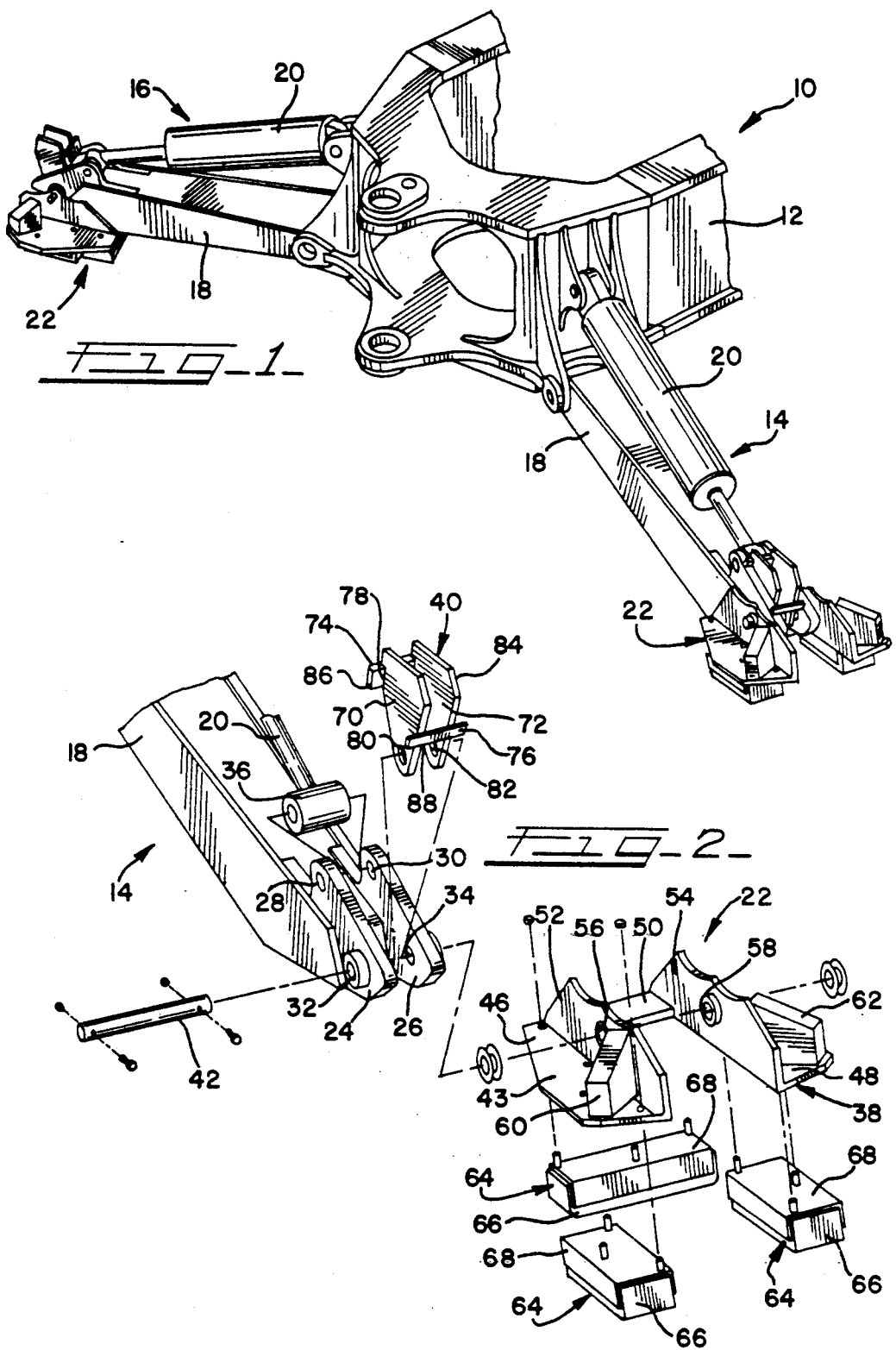

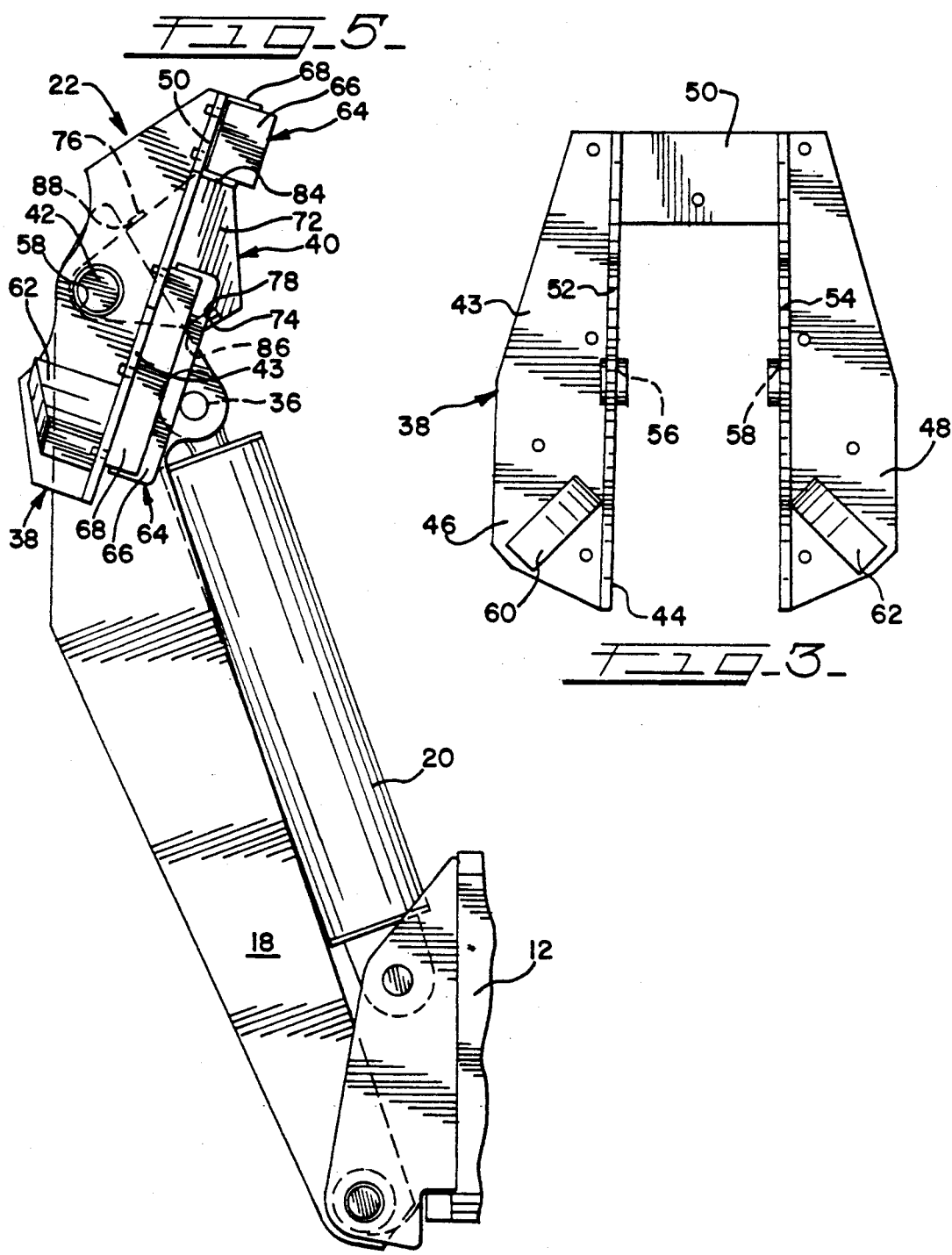

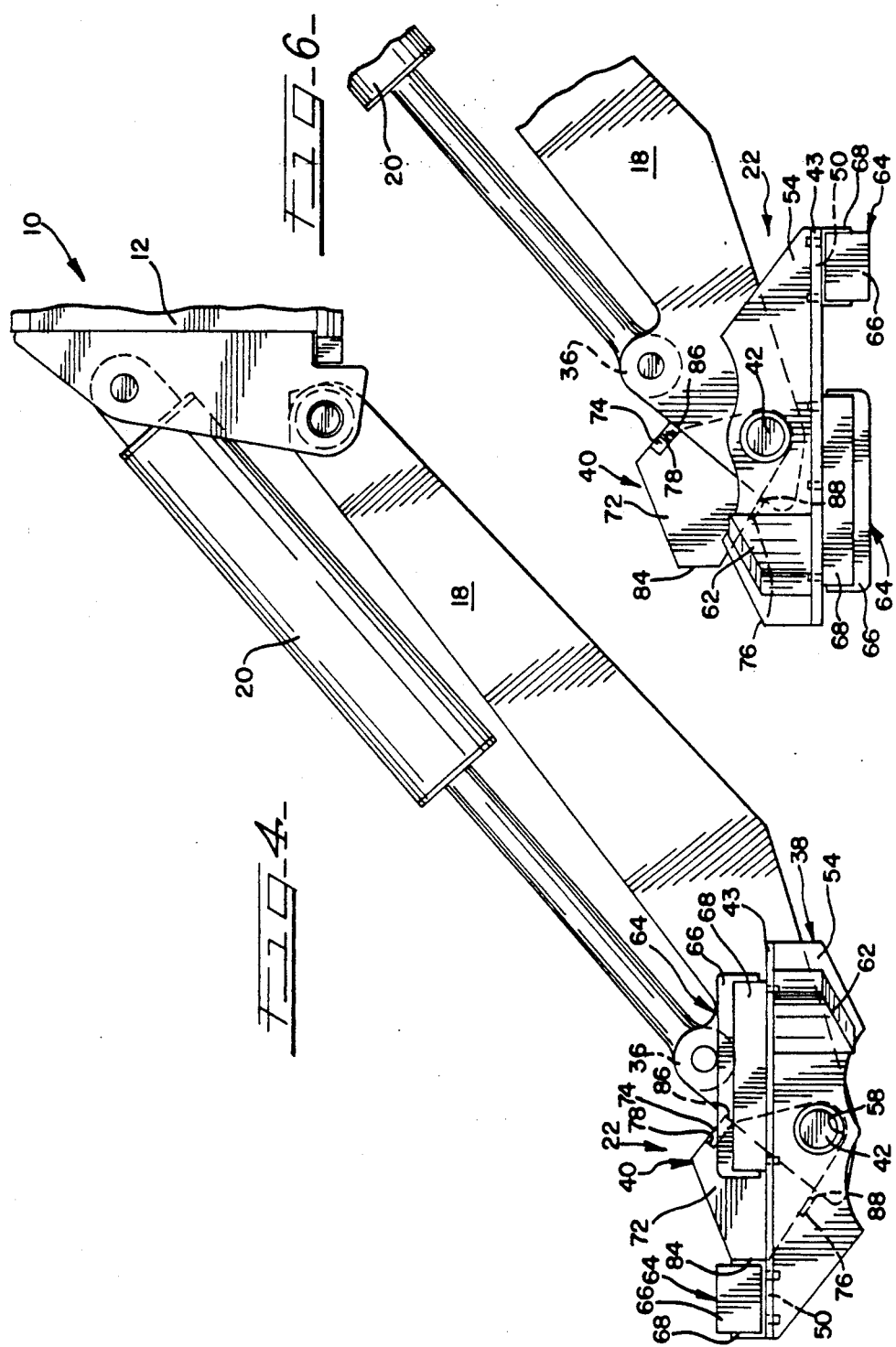

STABILIZER PAD ASSEMBLY FOR AN EARTH MOVING APPARATUS

FIELD OF THE INVENTION

The present invention generally relates to an earth moving apparatus such as a loader/backhoe and the like and, more particularly, to a reversible pad assembly including a stabilizer pad which is movable between alternate positions for supporting the earth moving apparatus on different ground surfaces and a stop which limits movement of the stabilizer pad in one direction.

BACKGROUND OF THE INVENTION

An earth moving apparatus such as a loader/backhoe is relatively small and is extensively used in the construction industry. The backhoe of such an apparatus is used for digging trenches and the like. Such an apparatus is typically provided with support arms which extend outwardly from opposite sides of a frame to support the apparatus during operation of the backhoe. Each support arm is connected at its inner end to the frame and is provided with a stabilizer pad at its distal end to facilitate stabilization of the apparatus during operation of the backhoe.

Each support arm is vertically movable about its connection to the frame between raised and lowered positions under the influence of a linearly distendable driver. The driver typically includes an oversized hydraulic cylinder capable of developing the force necessary to facilitate stabilization of the apparatus. The oversized cylinder extends above and generally parallel to the support arm. A cylinder end of the driver is usually connected to the frame of the apparatus and a piston-rod end of the driver is connected near the distal end of the support arm.

To enhance the versatility of the loader/backhoe, some stabilizer pads are movable between alternate positions. Such reversible stabilizer pads facilitate supporting the loader/backhoe on ground surfaces of different textures. A reversible stabilizer pad is typically provided with a resilient support surface on one side for supporting the loader/backhoe on rigid, non-resilient ground surfaces, i.e., asphalt, concrete, etc., and a flanged support surface on the other side for supporting the loader/backhoe on a more yielding ground surface, i.e., gravel, sand, loose dirt, etc.

In view of its intended use, the stabilizer pad is constructed for ruqged and abusive treatment. To readily allow reversal between alternate positions, the stabilizer pad is connected to a distal end of the support arm for pivotable rotation through about 180 degrees.

As will be appreciated, and depending on the texture of the ground surface, the operator of the earth moving apparatus forcefully moves the stabilizer pad about its pivot between alternate positions without significant concern for damage to the pad or to the apparatus as a whole. The stabilizer pad is configured with a generally U-shaped design allowing for free rotation about its connection to the support arm so that one or the other support surface may engage the ground surface.

The U-shaped design of the reversible stabilizer pad includes a cross-member extending laterally across the support arm. When the stabilizer pad is forcibly rotated such that the flanged support surface of the pad is arranged to engage the ground surface, the cross-member on the stabilizer pad presents a problem. The problem results from the cross-member on the stabilizer pad hitting and causing damage to the piston-rod end of the driver. Because of its forceful movement between positions, contact between the stabilizer pad and piston-rod end of the driver typically results in sufficient damage to the driver to require replacement of the oversized driver.

Another problem with reversible stabilizer pads has been observed when the support arm is moved to its fully raised position. With the support arm in a fully raised position, the stabilizer pad rotates about its connection to the support arm and has a tendency to assume an improper posture when the support arm is returned to a lower position. The improper posture of the stabilizer pad forces the operator to temporarily cease operation and properly orientate the stabilizer pad.

A proposed solution to these problems is to configure the support arm with a stationary stopping surface which engages and limits stabilizer pad movement. Notably, not all loader/backhoes are equipped with reversible stabilizer pads. Those loader/backhoes not so equipped do not require a limit stop for the stabilizer pad provided thereon. As will be appreciated, to manufacture and stock different support arms dependent on the type of stabilizer pad to be associated therewith is problematical and costly.

Another proposed solution involves the provision of a stop at the distal end of the support arm. It is known to provide a stop which includes a lever with a stop pin transversely extending therefrom. The lever extends outwardly from and is welded to the support arm. The stop pin extends from a free end of the lever and is positioned in the path of the stabilizer pad for preventing complete 360-degree rotation thereof.

In addition to its weight, the momentum of the stabilizer pad moving toward the driver imparts a significant force to the stop when it impacts thereon. Should either the stop pin or the weld securing the lever to the support arm fail as a result of such impact forces, the stabilizer pad will impact against the piston-rod end of the driver, ultimately causing damage thereto. Because of its size, the driver is both difficult and costly to repair or replace. Moreover, careful positioning and welding of the lever to the support arm is required to properly position the pin and increases fabrication costs of the stop and, thereby, the overall cost of the loader/backhoe.

SUMMARY OF THE INVENTION

In view of the above, and in accordance with the present invention, there is provided a stabilizer pad assembly including a reversible stabilizer pad and a pad limit stop designed as an attachment to a support arm of an earth moving apparatus. As is conventional, the support arm is moved under the influence of a linearly distendable driver, such as an oversized hydraulic cylinder. The pad limit stop is configured to wedge between the stabilizer pad and a distal end of the support arm, thereby limiting movement of the stabilizer pad and inhibiting damage to the driver as a result of the stabilizer pad being moved between alternate positions.

The stabilizer pad has a plate-like configuration with a cut-out opening and two opposed sides defining different ground engaging surfaces. The stabilizer pad is connected to a distal end of the support arm for pivotable movement between a first position wherein a first side of the pad engages a ground surface and a second position wherein a second side of the pad engages a ground surface. In a preferred form, the stabilizer pad is connected to the support arm by a pivot pin defining a pivot axis for the pad.

In the illustrated embodiment, one side of the stabilizer pad has a resilient ground engaging surface which deforms when in contact with a non-resilient ground surface, such as asphalt. The resilient ground engaging surface is defined by one or more resilient pads secured to and projecting from the stabilizer pad. The resilient pads are preferably secured within metal channels which are secured to the stabilizer pad.

The pad limit stop is removably connected to the distal end of the support arm as an attachment and is configured to wedge between the stabilizer pad and the support arm, thereby limiting movement of the stabilizer pad toward the driver and, thus, inhibiting damage to the driver resulting from contact with the pad. In the preferred embodiment, the pad limit stop is removably connected to the support arm by the same pivot pin which connects the stabilizer pad to the arm.

The pad limit stop defines a series of different stopping surfaces. One stopping surface engages at least a portion of the support arm on one side of the pin that connects the limit stop to the support arm. Another stopping surface engages at least a portion of a resilient pad projecting from the stabilizer pad. Still another stopping surface on the limit stop engages the support arm on the opposite side of the pin that connects the limit stop to the support arm.

In its preferred form, the pad limit stop is a weldment comprised of a pair of laterally spaced and joined plates which are attached to the distal end of the support arm by the pivot pin. The plates are preferably joined by arms extending above and across the distal end of the support arms. The plates combine to define one stopping surface, while the arms combine to define the remaining stopping surfaces.

The ability of the pad limit stop to wedge between the support arm and the stabilizer pad provides a substantially solid stop capable of absorbing the impact forces transmitted thereto by the stabilizer pad and inhibits damage to the driver. Connecting the pad limit stop as an attachment to the support arm readily and easily allows the limit stop to be used only in those situations where a reversible pad is used in combination with a support arm.

The ability of the pad limit stop to be added as an attachment, in a manner protecting the driver, is beneficial from both a manufacturer and dealer viewpoint. By providing a pad limit stop as an attachment, the same support arm can be used regardless of the design of the stabilizer pad used in combination therewith. Accordingly, manufacturing and inventory costs can be reduced. Additionally, the provision of a pad limit stop properly positions or postures the stabilizer pad when the support arm is raised into an elevated position, such that the weight of the stabilizer pad automatically orientates the pad into a proper position relative to the ground surface with which it is going to engage.

Numerous other features and advantages of the present invention will become readily apparent from the following detailed description, appended drawings, and accompanying claims.

BRIEF DESCRIPTION OF THE DRAWINGS

FIG. 1 is a fragmentary view of a typical loader/backhoe with stabilizer pad assemblies according to the present invention mounted thereon;

FIG. 2 is an exploded perspective view of a free end of a support arm and the components of the stabilizer pad assembly of the present invention;

FIG. 3 is a top plan view of a stabilizer pad;

FIG. 4 is a side elevational view of the stabilizer pad assembly in a lowered position;

FIG. 5 is a side elevational view of the stabilizer pad assembly in a raised position; and FIG. 6 is a side elevational view similar to FIG. 4, but having the stabilizer pad rotated about 180 degrees.

DETAILED DESCRIPTION OF THE PRESENT INVENTION

While the present invention is susceptible of embodiment in various forms, there is shown in the drawings a presently preferred embodiment hereinafter described with the understanding that the present disclosure is to be considered as an exemplification of the invention and is not intended to limit the invention to the specific embodiment illustrated.

Referring now to the drawings, wherein like reference numerals indicate like parts throughout the several views, there is shown an earth moving apparatus such as a loader/backhoe which is depicted only fragmentarily and is seen as represented in its entirety in FIG. 1 by reference numeral 10. The loader/backhoe includes a frame 12 with stabilizer arms 14 and 16 connected thereto and outwardly projecting from opposite sides thereof. The stabilizer arms 14 and 16 are substantially similar to each other. For purposes of succinctness and brevity, therefore, only stabilizer arm 14 will be discussed in detail, with the understanding that stabilizer arm 16 is similarly constructed.

Each stabilizer arm includes an elongated support arm 18, a driver 20, and a stabilizer pad assembly 22 connected to a distal end of the support arm 18. An inner end of the support arm is pivotally connected to the frame 12. To facilitate movement of the apparatus 10, each support arm 18, along with the stabilizer pad assembly 22 connected thereto, is movable between raised and lowered positions under the influence of the driver 20.

As illustrated in FIG. 2, and to facilitate fabrication without detracting from its strength, each support arm 18 is a weldment and is provided with transversely spaced protrusions or projections 24 and 26 toward the distal end of the support arm 18. The projections 24 and 26 define a first pair of transversely aligned bores 28 and 30, respectively, and a second pair of transversely aligned bores 32 and 34, respectively. As illustrated, the first pair of bores 28, 30 are linearly spaced along the length of the support arm from the second pair of bores 32 and 34.

In the preferred embodiment, driver 20 is an oversized hydraulic cylinder which extends above and generally parallel to the stabilizer arm which it is adapted to move. The cylinder end of the driver 20 is connected to the frame 12. A piston-rod or operative end of each driver 20 is provided with an eye member 36. The eye member 36 of the driver is connected near a distal end of the support arm. In the illustrated embodiment, the piston-rod end of driver 20 is connected to arm 18 as by passing a suitable pin through the bores 28 and 30 and through the eye member 36 of the driver.

The stabilizer pad assembly 22 is releasably secured as an attachment to a distal end of a respective stabilizer arm. As illustrated in FIG. 2, each stabilizer assembly 22 includes a stabilizer pad 38 and a pad limit stop 40. Both the stabilizer pad 38 and the pad limit stop 40 are secured by a common pivot pin 42 which passes through the second pair of transversely aligned bores 32 and 34 provided at the distal end of the support arm 18. The pivot pin 42 defines a transverse pivot axis about which the stabilizer pad 38 is fixed relative to the distal end of the support arm and about which the stabilizer pad 38 pivotably moves between alternate positions. The pin 42 may be releasably secured in place by suitable retainers provided at opposite ends thereof.

As illustrated in FIG. 3, the stabilizer pad 38 includes a generally flat plate 43 having a generally U-shaped configuration and defining a cut-out opening 44 which allows movement of the stabilizer pad 38 for substantially one-half revolution. The generally flat plate 43 includes transversely spaced side members 46 and 48 which are joined by a cross-member 50. For supporting the earth moving apparatus on ground surfaces of different textures, the stabilizer pad 38 is provided with first and second sides.

As illustrated in FIGS. 2, 3 and 4, one side of the stabilizer pad 38 is provided with laterally spaced flanges 52 and 54 which extend away from the flat plate 43. Intermediate their ends, the flanges 52 and 54 define transversely aligned bores 56 and 58, respectively, through which pivot pin 42 extends in a manner pivotably and releasably securing the pad 38 to the distal end of the stabilizer arm. A pair of counterweights 60, 62 may also be provided on the stabilizer pad 38 to provide additional support for each of the flanges 52 and 54, respectively, in the illustrated embodiment.

A resilient pad structure which deforms when in contact with a non-resilient ground surface, such as asphalt or the like, defines a second ground engaging surface on the opposite side of plate 43. As illustrated in FIG. 2, the side members 46 and 48 and the cross-member 50 each have a resilient pad 64 secured thereto and projecting therefrom. Each resilient pad 64 comprises one or more pads of resilient material 66, such as stiffened rubber strips or the like, secured within a metal channel 68. The metal channel 68 of each resilient pad is suitably secured to a side of the flat plate 43.

The pad limit stop 40 of the stabilizer pad assembly 22 is provided to limit movement of the stabilizer pad 38 and thereby inhibit damage to the operative end of the driver 20 from the stabilizer pad 38 being moved between alternate positions. As illustrated in FIG. 5, the pad limit stop 40 is configured to wedge between the stabilizer pad 38 and the distal end of the support arm 18 to prevent the pad 38 from rotating about pin 42 past the position illustrated, thus preventing the cross-member 50 on the stabilizer pad 38 from contacting the driver 20.

Returning to FIG. 2, the pad limit stop 40 is preferably fabricated as a weldment comprised of a pair of transversely spaced plates 70 and 72 which are rigidly joined to each other by arms 74 and 76. When the pad limit stop 40 is attached to a distal end of a support arm 18, the plates 70, 72 are accommodated between the projections 24 and 26 at the distal end of the support arm. In the illustrated embodiment, and to add strength to the pad limit stop 40, arm 74 is accommodated and secured within a recessed channel 78 defined by the plates 70 and 72. Moreover, the plates 70 and 72 of the limit stop 40 define transversely aligned bores 80 and 82, respectively, through which the pivot pin 42 extends in a manner pivotably and releasably securing the pad limit stop 40 to the distal end of a stabilizer arm. As illustrated, the arms 74 and 76 extend beyond the sides of the plates 70 and 72 such that at least a portion of each arm 74, 76 extends across and above the projections 24, 26 at the distal end of each support arm.

The pad limit stop 40 defines a series of stopping surfaces thereon which engage at least a portion of the respective support arm 18 and at least a portion of the respective stabilizer pad 38 in a manner limiting movement of the stabilizer pad 38 toward the driver 20. In the illustrated embodiment, the plates 70 and 72 combine to define a first stopping surface 84, while the arms 74 and 76 define separate stopping surfaces 86 and 88, respectively. As illustrated in FIG. 4, stopping surface 86 engages the support arm 18 on one side of the transverse axis of pin 42, while stopping surface 88 engages the support arm 18 on an opposite side of the transverse axis of pin 42.

Depending upon the ground texture on which the loader/backhoe is to be supported, the stabilizer pad assembly 22 may be rotated into either of two alternate positions. In a first position, and wherein the ground surface on which the loader/backhoe is to be supported is soft, such as dirt, sand, gravel or the like, the flanges 52 and 54 on the stabilizer pad 38 extend downwardly toward the ground surface and the resilient pads 64 are arranged generally above the pin 42 as illustrated in FIG. 4. In a second position, and wherein the ground surface on which the loader/backhoe is to be supported is comprised of asphalt or cement, the resilient pads 64 are positioned downwardly beneath the pin 42 to engage the ground surface as illustrated in FIG. 6.

When the flanges 52, 54 on the stabilizer pad 38 face downward to engage the ground surface and the respective support arm is moved into a raised position (FIG. 5) under the influence of driver 20, the pad limit stop 40 limits the movement of the stabilizer pad 38 toward the driver 18 and thereby inhibits damage to the driver 20. When the stabilizer arm is moved into its fully raised position, the stopping surface 86 on the pad limit stop 40 engages the distal end of the support arm 18 while the stopping surface 84 is wedged beneath the metal channel 68 on the resilient pad 64 and prevents the stabilizer pad 38 from rotating past the position shown in FIG. 5, thereby preventing the cross-member 50 from contacting the driver 20. The wedging action of the pad limit stop between the pad and the distal end of the support arm provides a substantially solid stop capable of absorbing the impact forces transmitted thereto by the movement of the stabilizer pad.

Moreover, the pad limit stop 40 properly postures the stabilizer pad 38 for proper placement when the stabilizer arm is moved into a lowered position. As will be appreciated, the pad limit stop 40 limits the movement of the stabilizer pad about the pivot pin 42. Limiting arcuate movement of the stabilizer pad about the pivot pin 42 facilitates proper posturing of the pad 38 relative to the ground surface when the stabilizer arm is moved to its lowered position (FIG. 4).

During movement of the stabilizer arm from the raised position, illustrated in FIG. 5, to a lowered position, as illustrated in FIG. 4, the pad limit stop 40 allows free rotation of the stabilizer pad 38 about the pivot pin 42. As illustrated, the stopping surface 88 of the limit stop 40 engages the support arm 18 and thereby inhibits substantial rotational movement of the pad limit stop about the pin 42. Moreover, the stopping surface 88 properly positions the pad limit stop 40 such that it wedges between the pad 38 and the distal end of the support arm 18 when the stabilizer arm is again moved to a raised position.

The configuration of the stabilizer pad 38 allows for rotation thereof about the pin 42 such that a resilient ground engaging surface as defined by the resilient pads 64 may be used to engage a non-resilient ground surface, such as asphalt, cement, etc., as illustrated in FIG. 6. Notably, the pad limit stop 40 is configured to readily permit adequate rotation of the pad 38 such that either alternative ground surface on the pad can be readily used to support and stabilize the apparatus 10.

As will be understood, only some loader/backhoes use reversible stabilizer pads. An advantage of the present invention is that both reversible and conventional stabilizer pads can be interchangeably used with a common support arm. If a conventional stabilizer pad is used in combination with the stabilizer arms, there may be little need for a pad limit stop. On the other hand, by designing the pad limit stop 40 as an attachment, it can be readily and conveniently added as part of the stabilizer pad assembly in those arrangements when a reversible pad is used in combination with the stabilizer arm. The use of a common pivot pin 42 for attaching both the stabilizer pad 38 and the pad limit stop 40 to the distal end of the support arm further enhances the ability to quickly and readily interchange a conventional stabilizer pad with a reversible pad and thereby broaden the versatility of the loader/backhoe apparatus.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover by the appended claims all such modifications as fall within the scope of the claims.

I claim:

1. A stabilizer pad assembly connected to a support arm of an earth moving apparatus including a driver for vertically moving said support arm with the stabilizer pad connected thereto, said stabilizer pad assembly comprising:
    stabilizer pad means for supporting the earth moving apparatus on ground surfaces of different textures, said pad means having a plate-like configuration defining a cut-out opening and two opposed sides, with each side defining a ground engaging surface, said pad means being connected to a distal end of said support arm for pivotable movement through a substantially one-half revolution between a first position wherein a first side of said pad means engages said ground surface and a second alternate position wherein a second side of said pad means engages said ground surface; and
    pad limiting means connected to said pad means and said support arm for limiting movement of said pad means toward said driver and thereby inhibiting damage to said driver from said pad means being moved between alternate positions, said pad limiting means being configured with surfaces adapted to engage and wedge between at least a portion of said pad means and an upper surface of the support arm such that when the support arm is lifted toward a raised position and said pad means is pivotably moved toward the driver, impact forces resulting from limiting movement of said pad means toward said driver are transferred through said pad limiting means and distributed across the engaging surfaces.

2. The stabilizer pad assembly according to claim 1 wherein said pad limiting connection further includes means defining a pivot axis for said pad means, said pivot axis being fixed relative to the distal end of said support arm.

3. The stabilizer pad assembly according to claim 2 wherein said pad limiting means is removably connected as an attachment to the distal end of said support arm.

4. The stabilizer pad assembly according to claim 1 wherein said pad means includes resilient means projecting from one side of said pad means to define a ground engaging surface which is deformed when in contact with a non-resilient ground surface.

5. A stabilizer pad assembly connected to a support arm of an earth moving apparatus, said support arm being vertically moveable between a raised position and a lowered position under the influence of a linearly distendable driver, said stabilizer pad assembly comprising:
    a stabilizer pad for supporting the earth moving apparatus on ground surfaces of different textures, said pad having a plate-like configuration defining a cut-out opening and two opposite sides including a first side that has a ground engaging surface which deforms when in contact with a non-resilient ground surface, and a second side;
    connecting means including a pin connecting said pad to a distal end of said support arm for pivotable movement relative to said support arm through an angle of about 180 degrees between first and second alternate positions, wherein in said first position said first side of said pad is arranged above said pin, while in said second position said first side of said pad is arranged below said pin; and
    limiting means pivotably connected to said stabilizing pad and said support arm by said pin for wedging between said pad and the distal end of said support arm when said pad is moved from said second position to said first position and thereby limiting pivotable movement of said pad to protect said driver against damage when said pad is moved from said second position to said first position and to arrange said pad in a predetermined position relative to said arm when said arm is vertically moved to said raised position so as to facilitate positioning of said pad relative to the ground surface upon a return movement of said support arm to said lowered position, and wherein upon movement of said pad from said second to said first position a surface on said limiting means engages a surface on said support arm to enable transfer and distribution of impact forces across said engaging surfaces resulting from limiting movement of said pad toward said driver.

6. The stabilizer pad assembly according to claim 5 wherein the ground engaging surface on the first side of said stabilizer pad is defined by resilient pad means comprised of resilient material pieces secured within metal channels, said metal channels being secured to said first side of said pad.

7. The stabilizer pad assembly according to claim 6 wherein said limiting means defines a first stopping surface which engages at least a portion of said resilient pad means and a second stopping surface which engages at least a portion of said support arm, and wherein the engagement of said stopping surfaces with said resilient pad means and said support arm limits movement of said stabilizer pad toward said driver.

8. A stabilizer pad assembly connected to a support arm of an earth moving apparatus, said support arm being vertically moveable between a raised position and a lowered position under the influence of a linearly distendable driver, said stabilizer pad assembly comprising:

a stabilizer pad for supporting the earth moving apparatus on ground surfaces of different textures, said pad having a plate-like configuration defining a cut-out opening and two opposite sides including a first side that has a ground engaging surface which deforms when in contact with a non-resilient ground surface and a second side;

connecting means including a pin connecting said pad to a distal end of said support arm for pivotable movement relative to said support arm through an angle of about 180 degrees between first and second alternate positions, wherein in said first position said first side of said pad is arranged above said pin, while in said second position said first side of said pad is arranged below said pin; and limiting means movably connected to said stabilizer pad and said support arm by said pin for wedging between said pad and the distal end of said support arm when said pad is moved from said second position to said first position and thereby limiting pivotably movement of said pad to protect said driver against damage when said pad is moved from said second position to said first position and to arrange said pad relative to said arm when said arm is moved to said raised position, said limiting means defining first, second and third stopping surfaces, the first stopping surface being adapted to engage with at least a portion of said pad and combine with the second stopping surface which is adapted to engage with the support arm on one said of said pin to limit movement of the stabilizer pad toward the driver, and wherein the third stopping surface being adapted to engage said support arm on an opposite side of said pin to restrict movement of said limiting means when said stabilizer pad is moved to said second position.

9. The stabilizer pad assembly according to claim 8 wherein said limiting means comprises a pair of laterally spaced and joined plates which are attached to the distal end of said support arm by said connecting means.

10. The stabilizer pad assembly according to claim 9 wherein said plates are joined by arms extending above and across the distal end of said support arm and wherein said plates define said first stopping surface and said arms define said second stopping surface.

* * * * *